UNITED STATES PATENT OFFICE.

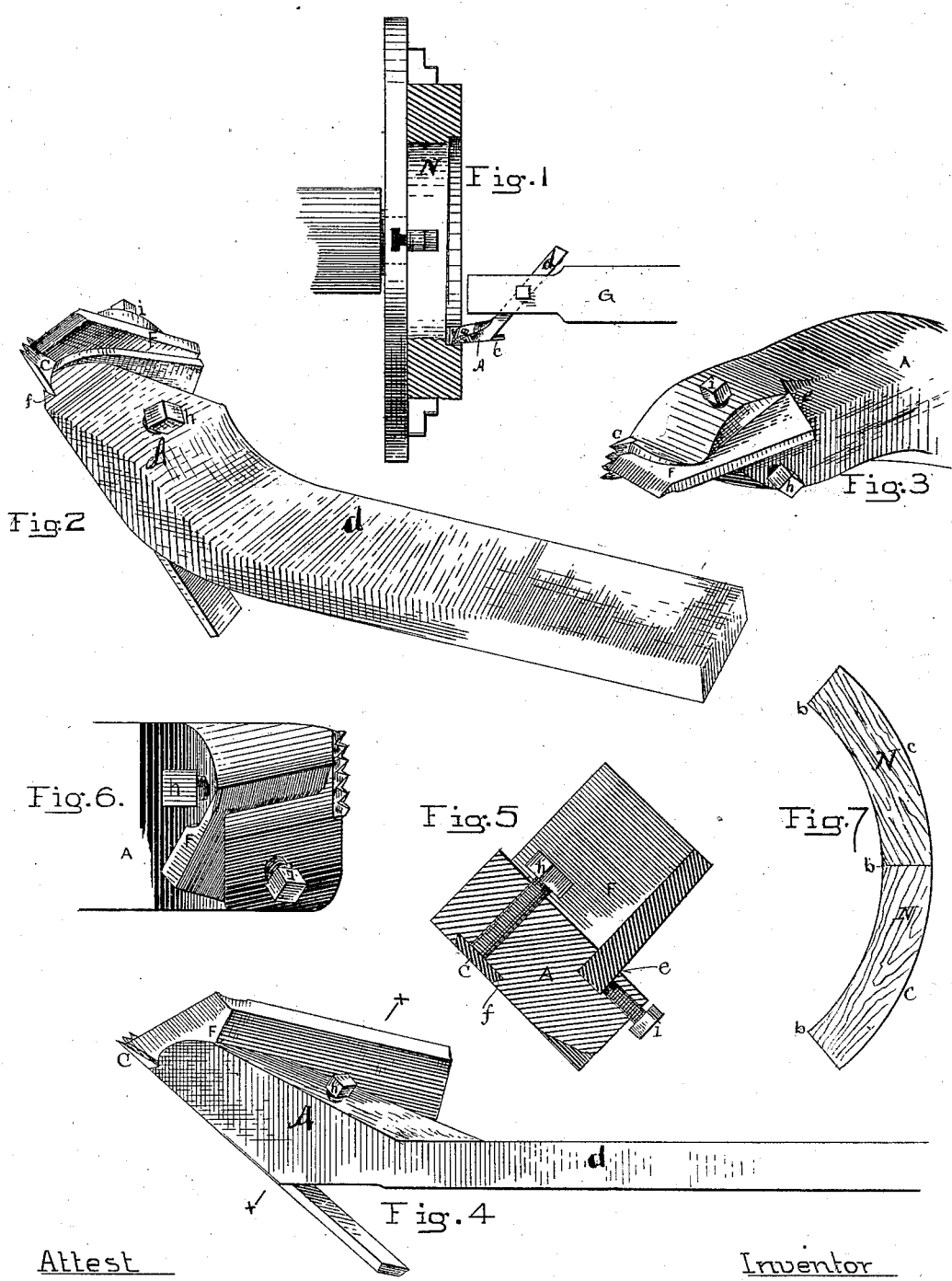

GEORGE PHILION, OF MISHAWAKA, INDIANA, ASSIGNOR TO THE DODGE MANUFACTURING COMPANY, OF SAME PLACE.

TOOL FOR TURNING THE FACES OF PULLEY-RIMS.

SPECIFICATION forming part of Letters Patent No. 368,851, dated August 23, 1887.

Application filed September 29, 1886. Serial No. 214,843. (No model.)

*To all whom it may concern:*

Be it known that I, GEORGE PHILION, of Mishawaka, in the county of St. Joseph and State of Indiana, have invented new and useful Improvements in Tools for Turning the Faces of Pulley-Rims and the like, of which the following is a specification.

The rims of wooden pulleys are built up of separate wooden rings, each composed of four or more curved segments, N, cut from boards or planks of suitable wood, all solidly glued together. The grain of the wood necessarily runs obliquely across certain corners of the segment, as at $b$ and $c$. In the process of turning the inner and outer surfaces of the rim with ordinary tools and with the best skill portions of the wood are liable to split off at these points.

The object of my invention is to produce a tool which, while held rigidly in the tool-stock of a suitable machine, may be caused to remove the surplus wood at a single operation and without danger of splitting off the exposed portion.

My invention consists, therefore, of a tool having a leading cutting-edge substantially coincident with the desired curve of the pulley-rim, either external or internal, and a cutting-bit substantially radial to said curve. The leading-cutter stands a little in advance of the radial cutter, so that the fibers of the wood are severed on the peripheral curve without being removed, and the radial cutter follows, cutting to the depth penetrated by the leading-cutter. For convenience the leading-cutter and the following cutter are separate bits mounted on the same tool-stock and separately adjustable.

Figure 1 is an elevation of the chuck, with the pulley-rim shown in section and the tool in its tool-stock. Fig. 2 is a perspective of my invention, top side. Fig. 3 is a perspective of the same, bottom side. Fig. 4 is a bottom plan of the same. Fig. 5 is a transverse section on line $x\,x$. Fig. 6 is a front elevation of my cutting-tool. Fig. 7 is a plan of a portion of a segment-ring, showing the parts liable to be split off.

A is the tool-stock, the shank $d$ whereof is oblique to the plane of the leading-cutter C, so that the arm or carriage G of the machine to which said stock is attached may be away from the line of cut and free to pass by.

The stock A is provided with two undercut or dovetailed grooves, $f\,e$, the former to receive the shank of the leading-cutter C, the other to receive the following cutter F. The grooves $f$ and $e$ are cut in opposite sides of the stock A, but are inclined to each other in such manner that when said cutters are caused to slide endwise in their several grooves they will advance toward or recede from each other, and they will be properly set relatively to each other when they make contact and the cutter C is slightly in advance of the other.

When the cutters, or either of them, require sharpening, one or both may be withdrawn, and after being sharpened returned to its place in its stock. The cutters C F are locked in place by set-screws $h\,i$.

By the use of this tool the rough pulley may be turned true to diameter at a single operation of the tool, whether the wood to be removed is of the thickness of a hair or in considerable mass, because the leading-cutter severs the fiber in advance of the following cutter, which removes it.

I am aware that a crozing-machine has been made having a dish-shaped saw and an adjustable cutting-blade arranged in a plane transverse to the saw, whereby its edge next to the saw is inclined to the saw-blade.

I am aware that several cutters have been arranged in the same machine to effect different results—as, for instance, in barrel machinery one cutter-head has been provided with separate cutters, one to trim the edge of the head, and another to bevel the same; or two cutters to cut the croze, one cutting the sides and the other excavating the material. I am also aware that boring-bits have been provided with leading-cutters to cut the side and following cutters to excavate the material, and that two cutters have been combined for this purpose in a great variety of ways. My invention therefore does not rest on the relative arrangement of the cutters as to each other, but upon the cutters and stock as a whole, constituting a tool which, as an entirety, may be put in the tool-holder of a machine.

Having described my invention, I claim as new—

1. The combination, with a tool-stock having a face and a seat adjacent thereto, of a leading-cutter secured to the face in such a position as to bring the cutting-edge in substantially a curved line, and a following cutter secured to the seat in such position as to bring its cutting-edge within the curve of the leading-cutter and in a plane inclined to such curve, as and for the purpose described.

2. A tool-stock, A, having two seats, $f$ $e$, in planes substantially transverse, and with the seat $e$ inclined edgewise or laterally toward the plane of the seat $f$, combined with the cutting-bits C F, adjustably secured in said seats, respectively, whereby the end of the cutting-edge of the bit F may be caused to touch the side of the bit C, to prevent the passage of chips between them.

3. Combined with a reciprocating tool-holder, G, a tool-stock, A, having a shank, $d$, adapted to pass obliquely through said tool-holder, and provided with a seat, $f$, to receive a cutting-bit, C, with its cutting-edge substantially parallel with the plane of advance of said holder G, and a seat, $e$, to receive a cutting-bit, F, with its cutting-edge substantially transverse to said plane of advance, whereby the cutter C will cut across the fibers in a line exterior to the holder G, and the cutter F will remove the severed material in advance of said holder, substantially as set forth.

GEORGE PHILION.

Witnesses:
W. B. HOSFORD,
M. W. MIX.